May 5, 1931.  A. H. RINEY ET AL  1,803,437
PIPE LINE CONTROLLING MEANS
Filed Sept. 6, 1930  2 Sheets-Sheet 2
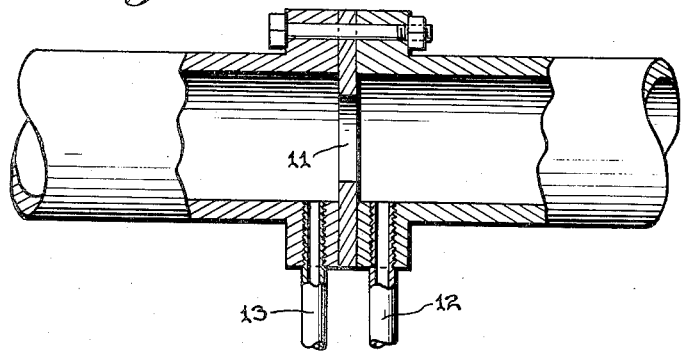
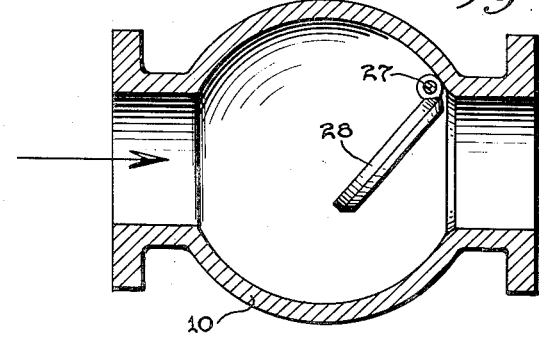
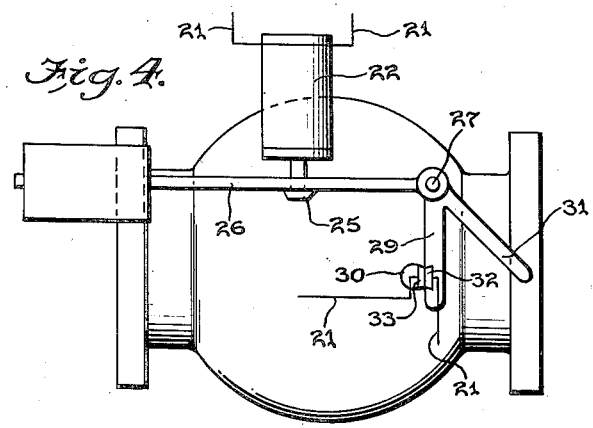
Inventors
Arthur H. Riney
Lloyd T. Gibbs,
By Robt. E. Barry
Attorney Patented May 5, 1931

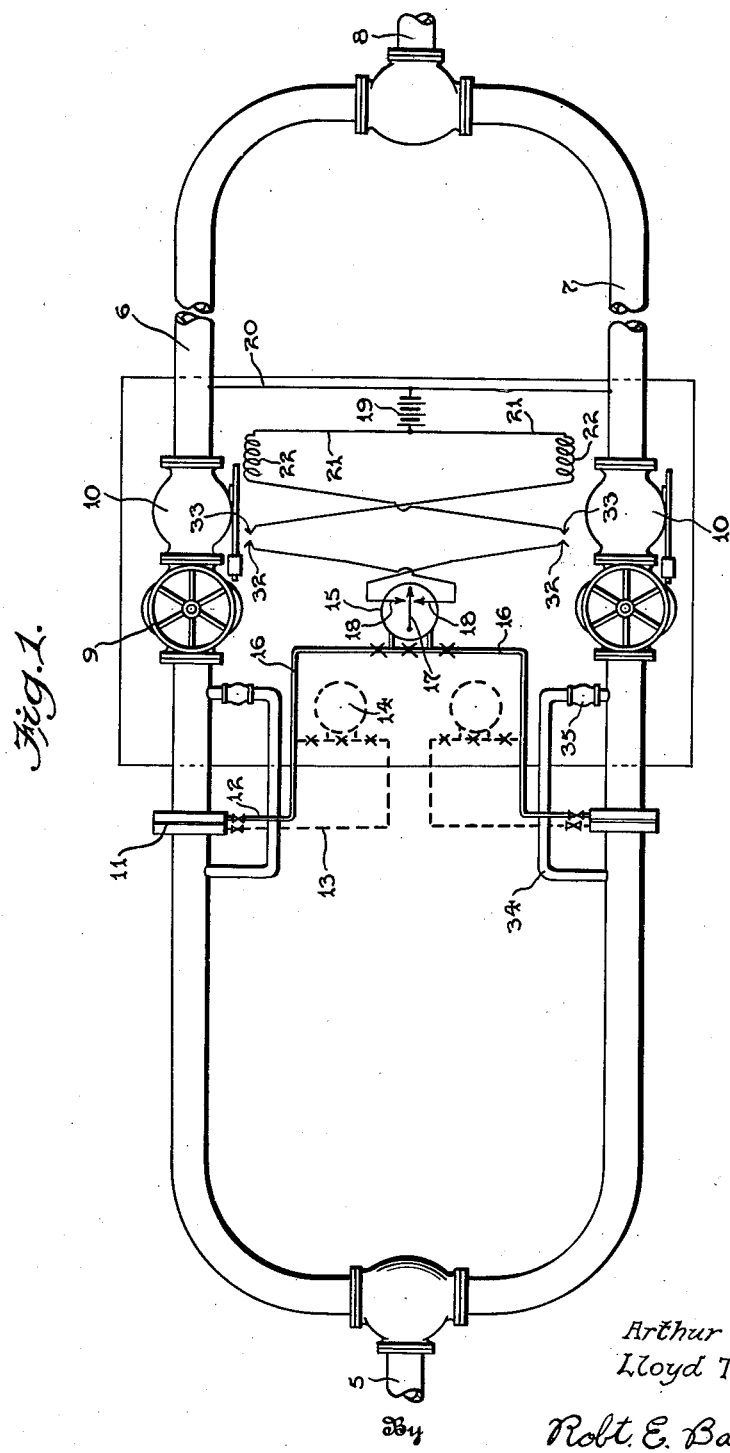

1,803,437

UNITED STATES PATENT OFFICE

ARTHUR H. RINEY AND LLOYD T. GIBBS, OF BARTLESVILLE, OKLAHOMA, ASSIGNORS TO PHILLIPS PETROLEUM COMPANY, OF BARTLESVILLE, OKLAHOMA

PIPE-LINE-CONTROLLING MEANS

Application filed September 6, 1930. Serial No. 480,258.

This invention relates to improvements in pipe line control means, and more especially to novel means for controlling valves in pipes crossing rivers, or located in inaccessible places, whereby in case one branch pipe of a system should leak, a valve in that branch will be automatically closed to shut off the flow therethrough, to allow the flow to be diverted to a second perfect branch.

The primary object of the invention is to furnish means for utilizing differential pressures in branch pipes for controlling valves arranged in said pipes.

Another object is to provide flow control means including a differential pressure indicator that is electrically connected with electrically operated valves in branch pipes, whereby if the pressure should fall in one branch pipe, the indicator will act to close the valve in that pipe.

A further object is to provide flow control means including a plurality of electrically operated valves, portions of which are in a common circuit, whereby if one valve is closed, the electrically operated means becomes inoperative, so that the other valve will remain open.

A still further object is to provide flow control means having special devices for equalizing the pressures at opposite sides of orifice plates in branch pipes.

With the foregoing objects outlined and with other objects in view which will appear as the description proceeds, the invention consists in the novel features hereinafter described in detail, illustrated in the accompanying drawing, and more particularly pointed out in the appended claims.

In the drawings,

Fig. 1 is a plan view of the improved apparatus.

Fig. 2 is an enlarged sectional view of one of the orifice plates and flanges.

Fig. 3 is a sectional view of one of the valves.

Fig. 4 is an elevation of one of said valves.

Referring to the drawing, 5 indicates a fluid feed line through which any suitable fluid flowing under pressure is introduced into branches 6 and 7 that empty into a discharge line 8. It is intended that the branch portions pass through a river or other obstruction which would render the branches inaccessible, and for the purposes of the present disclosure, we will assume that a hydrocarbon fluid is forced through a pipe line in which the branches 6 and 7 are interposed. At the entrance ends of the branches, each branch will be provided with a manually operated gate valve 9 and an electrically controlled valve 10, and for the purpose of controlling the electrically operated valves, each branch has an orifice plate 11 inserted between flanges of pipe sections forming the branch. Valved tubes 12 and 13 will lead from the down stream and up stream sides of the orifice plate to an indicating type orifice meter 14, which if desired, may indicate at a remote point or control station, whereby an operator at a central point may readily ascertain the pressure condition of the branches from a central office.

In accordance with the present invention, an indicating type differential meter 15 is connected by branch tubes 16 to the down stream tubes 12, and this meter is of the type having a pivoted hand 17 normally pointing to zero. Should the pressure in one of the branch tubes 16 fall below that existing in the other branch tube, the hand 17 will move away from zero, and will engage one of the contacts 18. These contacts are preferably mounted on the face of the instrument 15, and when the hand engages one of the contacts, a circuit in which that contact is located will be completed, and cause the closing of the valve 10 which is in the same circuit. The circuit may include an electric battery 19 connected by a wire 20 to the metal branches 6 and 7. Other wires 21 connect the battery to the contacts 18, and in each of the last mentioned wires, a solenoid 22 is interposed. As best shown in Fig. 4, each of these solenoids is connected to a trigger 25 of one of the valves 10. When the solenoid is energized, the trigger 25 will be withdrawn from a position in which it obstructs the dropping of a weighted arm 26. The shaft 27 of this arm is rigidly connected with the gate 28 of the valve 10, as shown in Fig. 3, and consequently, when the weighted arm drops, the valve will be closed. Valves of this type are of known construction, and may be purchased on the open market, and each of said valves has a stop arm 29 that is engageable with a fixed abutment 30 that projects from the side of the valve casing. Another arm 31 which is fixed to the shaft 27, acts as a lever to permit manual resetting of the valve.

It will be understood that the hand 17, by means of the branch tubes 16 and 12, is in electric connection with the branch pipes 6 and 7, so that a circuit will be completed through the solenoid 22 of one of the valves, each time the hand engages one or the other of the contacts 18.

In actual practice, each of the wires 21 will have interposed therein a switch for the opposite valve from that to which it is directly connected. Such a switch may comprise insulated contacts 32 and 33, mounted respectively on the arm 29 and stop pin 30, and each of these contacts will be connected to one portion of each wire 21. Consequently, when the valve 10 of one branch closes, the switch 32, 33 of the circuit in which the solenoid 22 of the opposite valve is arranged, will be opened, with the result that the valve of the opposite branch cannot be closed after the closing of the first mentioned valve.

By way of explanation, let us assume that the branch 6 becomes leaky. This will result in falling of the pressure in the uppermost branch tubes 12 and 16 of Fig. 1, and consequently, the hand 17 will move toward and engage the uppermost contact 18. This will cause the current to flow from the battery through the uppermost solenoid 22, and that solenoid will attract the trigger 25 of the uppermost valve 10. As the weighted arm 26 of that valve is released, it will fall and close that valve, and at the same time, the uppermost contacts 32 and 33 will be permanently separated so as to break any circuit which might be formed through the lower solenoid 22 of the lowermost valve. Therefore, when the fluid is diverted from the branch 6, and thrown into the branch 7, even though the pressure builds up in the latter branch, greater than that existing in the upper branch, the valve 10 in the lower branch 7 cannot be automatically closed. In other words, the electrical connections are such as to prevent a second one of the automatic valves from closing after a first one in a leaky line has closed. If cross connections were not made in the manner indicated, one automatic valve would close, and then the pressure in the opposite line would build up to a point where it would close the opposite valve and completely cut off the flow.

For the purpose of equalizing pressure conditions at the opposite sides of the orifice plates in the two branches, each branch has a by-pass 34, by-passing its orifice plate and provided with a manually actuated valve 35.

This method of controlling the valves is especially applicable to parallel lines in which changes in pressure produced by differences of flow in the lines may be used to operate electrically controlled valves to stop the flow in a broken line. At the same time, notice of this operation can be transmitted by radio, wireless or wired signals to a central point, if desired.

From the foregoing it is believed that the construction, operation and advantages of the invention may be readily understood by those skilled in the art, and it is apparent that changes may be made in the details disclosed, without departing from the spirit of the invention, as expressed in the claims.

What we claim and desire to secure by Letters Patent is:

1. A pipe line including a feed pipe and a discharge pipe connected together by branch pipes, each branch pipe having means for obtaining differential pressures therein and a cut-off valve, and automatically operating means actuated by differential pressure in the branches for closing a valve in the branch in which pressure falls below that of the other branch.

2. A pipe line having admission and discharge pipes connected together by substantially parallel branch pipes, an electrically controlled valve in each branch pipe, and means functioning due to differential pressures in the branches for closing the valve in the branch in which the pressure falls below that of the other branch.

3. A pipe line having admission and discharge pipes joined together by substantially parallel branch pipes, an orifice plate interposed in each branch pipe, an electrically controlled valve interposed in each branch pipe, a differential meter, tubes connecting the differential meter to the branches at one side of the orifice plates, and electrical means connecting said meter to said valves, whereby when the pressure in one of said branches at the down stream side of the orifice plate of that branch falls below that at the down stream side of the orifice plate of the other branch, the valve in the first mentioned branch will be closed.

4. A pipe line having admission and discharge pipes connected by substantially parallel branches, a normally open valve in each of said branches, a weight for closing each of said valves, electrically actuated means for releasing said weights, and means functioning due to difference in pressure between the two branches for actuating the last mentioned means.

5. A pipe line including admission and discharge pipes connected by substantially parallel branch pipes of similar diameter, a normally open valve in each branch pipe, and means actuated by differential pressures in the branches for closing the valve in either one of the branches when the pressure in the latter varies from that in the other branch.

6. A pipe line having admission and discharge pipes connected by substantially parallel branch pipes, a valve in each of said branch pipes, a weight for closing each of said valves, a trigger for normally holding each valve in open position, a solenoid for actuating each of said triggers, electric circuits in which the solenoids are interposed, and a switch functioning due to differences in pressure in the two branches for completing either one of said circuits and closing the valve in the branch in which the pressure falls below that of the other branch.

In testimony whereof, we hereto affix our signatures.

ARTHUR H. RINEY.
LLOYD T. GIB.